Oct. 29, 1940. J. W. JOHNSON 2,219,626

MOTOR VEHICLE DOOR HANDLE

Filed Dec. 27, 1939

John W. Johnson INVENTOR

BY *Victor J. Evans & Co.*

ATTORNEYS

Patented Oct. 29, 1940

2,219,626

UNITED STATES PATENT OFFICE 2,219,626

MOTOR VEHICLE DOOR HANDLE

John W. Johnson, Peoria, Ill.

Application December 27, 1939, Serial No. 311,193

3 Claims. (Cl. 74—535)

This invention relates to motor vehicle door handles and has for an object to provide a handle which may be disposed inside the vehicle, and which will embody means for preventing the handle being accidentally moved to open position by being struck by a passenger or tampered with by children.

A further object is to provide a handle having a pin disposed parallel with the door latch shaft and spring pressed to engage against a stationary shoulder on the door to lock the handle in closed position, the pin being released by a pin retracting member located on the inner side of the handle where it must be operated by the closing of the operator's fingers against the inner side of the handle when the handle is gripped to be turned to open the door latch, and thus cannot be accidentally actuated.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
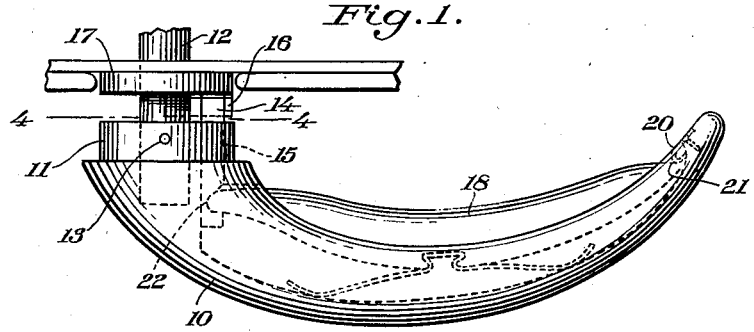
Figure 1 is a plan view of a door handle constructed in accordance with the invention.

Referring now to the drawing in which like characters of reference designate similar parts in the various views, 10 designates a motor vehicle door handle having a hub 11 which is secured to the end of the door latch shaft 12 inside the vehicle by a pin 13, or other connector. The handle is provided with a pin 14 which is slidably mounted as shown at 15 in the hub of the handle and is disposed parallel to the shaft 12.

Figure 5:
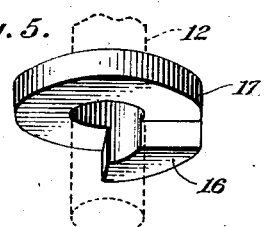
Figure 5 is a perspective view of the washer having a segmental stop lug against which the lock pin lodges.

In operative position the end of the pin is disposed against a segmental shaped stop lug 16, best shown in Figure 5, which is formed integral with a washer 17. The washer surrounds the shaft 12 and is fixed rigidly to the upholstered inner side of the vehicle door in any preferred manner. The pin, when engaged against the stop lug, locks the door handle against accidental movement in latch retracting direction.

A pin retracting member 18, of less length than the handle, is mounted in a recess 19 formed in the inner side of the handle and extends longitudinally of the handle. The outer end of the member is pivotally mounted in the outer end of the recess in the handle by a clip 20 which is secured to the handle and is provided with a rounded extremity 21 which bears against the member. The member is pivotally connected at the opposite end to the pin 14. For this purpose the pin is provided with a notch 22 which receives the end of the member.

Figure 2:
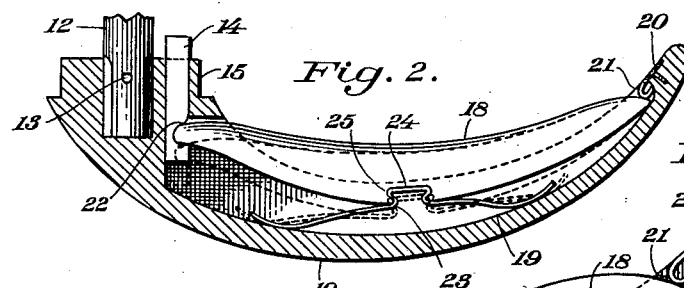
Figure 2 is a longitudinal sectional view of the door handle.
Figure 7:
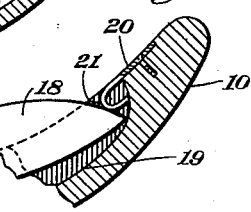
Figure 3:
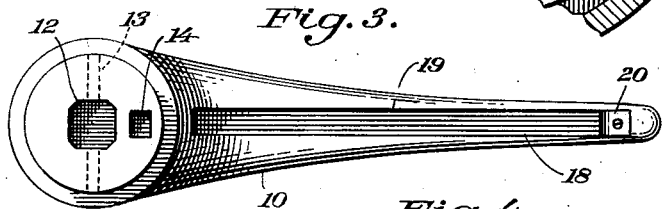
Figure 3 is a rear elevation of the door handle looking toward the pin retracting member.
Figure 4:
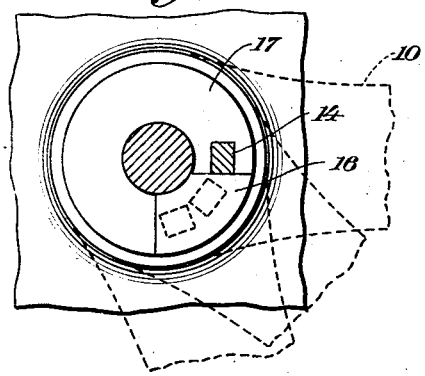
Figure 4 is a detail cross sectional view taken on the line 4—4 of Figure 1.
Figure 6:
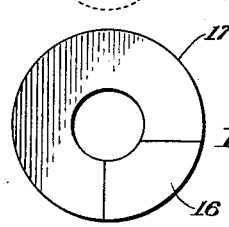
Figure 6 is a bottom plan view of the washer shown in Figure 5.

A leaf spring 23 is connected intermediate its ends to the member 18 preferably by an open elongated integral loop 24 which is engaged in a recess 25 formed in the member, as best shown in Figure 2. The ends of the spring bear against the bottom wall of the recess 19 and hold the member 18 at its outer limit of movement to yieldably hold the pin 14 against the side of segmental stop lug 16, as best shown in Figure 4.

In operation when the operator closes his fingers around the handle 10, and member 18, the member 18 is moved into the handle against the pressure of the spring 24 with the result that the pin 14 is retracted from engagement with the stop lug 16 of the washer 17 so that the handle is free to be turned in latch retracting direction.

From the above description it is thought that the construction and operation of the invention will be fully understood without further explanation.

What is claimed is:

1. A door handle having a hub at one end adapted to receive a door latch shaft, a pin slidably mounted in the hub and handle to extend parallel with the shaft, a washer adapted to be sleeved on the said shaft and anchored stationary to a door, a stop lug on said washer adapted to be engaged by said pin to hold the handle against accidental movement in latch retracting direction, a latch retracting member slidably mounted on the rear side of the handle and adapted to be slid into the handle by pressure of an operator's grip on the handle and on the member, a spring in the handle normally holding the member at its outer limit of movement, and a connection between said member and said pin adapted to withdraw the pin from engagement with the stop lug when the member is moved against the tension of said spring.

2. A door handle having a hub at one end adapted to receive a door latch shaft, there being a longitudinal groove in the inner side of the handle, there being an opening in the hub and handle communicating with said groove, a pin slidably mounted in the opening and adapted to extend parallel with said shaft, a washer adapted to be sleeved on said shaft and anchored stationary to a door, a stop lug on said washer adapted to be engaged by said pin to hold the handle against accidental movement in latch retracting direction, a latch retracting member mounted to slide in said groove parallel with said pin, a spring in the bottom of the groove for holding the member at its outer limit of movement, and a pivotal connection between the pin and one end of the latch retracting member adapted to withdraw the pin from engagement with the stop lug when the member is slid into the slot by pressure of an operator's grip on the handle and on the member.

3. A door handle having a hub at one end adapted to receive a door latch shaft, a pin slidably mounted in the hub and handle to extend parallel with the shaft, a washer adapted to be sleeved on the shaft and anchored stationary to a door, a stop lug on one face of the washer adapted to be engaged by said pin to hold the handle against accidental movement in latch retracting direction, there being a longitudinal groove in the rear side of the handle exposing said pin, a latch retracting member slidably mounted in the groove and pivotally connected at one end with the pi nand being adapted to retract the pin by pressure of an operator's grip upon the member and handle, and an arcuate leaf spring in said groove having its ends engaging the bottom of the groove and its central portion engaging said member for normally holding the member at its outer limit of movement.

JOHN W. JOHNSON.